United States Patent
Tyagi et al.

(10) Patent No.: US 10,417,470 B2
(45) Date of Patent: Sep. 17, 2019

(54) READING AND DISPLAYING OF DYNAMIC MACHINE-READABLE OPTICAL REPRESENTATION OF DATA

(71) Applicant: Motorola Mobility LLC, Chicago, IL (US)

(72) Inventors: Vivek K. Tyagi, Chicago, IL (US); Sudhir C. Vissa, Bensenville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 32 days.

(21) Appl. No.: 15/435,837

(22) Filed: Feb. 17, 2017

(65) Prior Publication Data

US 2018/0239939 A1 Aug. 23, 2018

(51) Int. Cl.
*G06K 7/14* (2006.01)
(52) U.S. Cl.
CPC .................. *G06K 7/1417* (2013.01)
(58) Field of Classification Search
USPC ...................................................... 235/462.11
See application file for complete search history.

(56) References Cited

U.S. PATENT DOCUMENTS

2012/0330845 A1* 12/2012 Kang ..................... G06Q 40/02
705/71

OTHER PUBLICATIONS

Peng, K. et al., "Security Overview of QR Codes", Massachusetts Institute of Technology Student Paper, 6.857 Computer and Network Security course, 2014, retrieved Feb. 10, 2017 from https://courses.csail.mit.edu/6.857/2014/files/12-peng-sanabria-wu-zhu-qr-codes.pdf.
Nesson, C., "Encoding Multi-layered Data into QR Codes for Increased Capacity and Security", South Dakota School of Mines and Technology, 2013, retrieved Feb. 10, 2017 from http://spact-center.org/wp-content/uploads/2014/07/Final-Report4.pdf.

* cited by examiner

*Primary Examiner* — Rafferty D Kelly

(57) ABSTRACT

Methods are disclosed for reading and displaying dynamic machine-readable optical representations of data. An example method includes: capturing a current frame of a plurality of frames with an optical sensing device, wherein each of the plurality of frames comprises syncdata and a portion of a data payload; decoding the syncdata and the portion of the data payload of the current frame, using a processor operatively coupled with the optical sensing device; storing the portion of the data payload of the current frame in a memory operatively coupled with the processor; determining whether all of the plurality of frames have been captured, based on the decoded syncdata, using the processor; if all of the plurality of frames have been captured, combining each stored portion of the data payload into the data payload, using the processor; and, if all of the plurality of frames have not been captured, repeating the above steps.

12 Claims, 8 Drawing Sheets

READING AND DISPLAYING OF DYNAMIC MACHINE-READABLE OPTICAL REPRESENTATION OF DATA

TECHNICAL FIELD

This application generally relates to reading and displaying of encoded information. In particular, this application relates to reading and displaying information encoded in a dynamic machine-readable optical representation of data.

BACKGROUND

Machine-readable optical representations of data are an intrinsic part of modern life. For example, barcodes, which store data in one dimension, are ubiquitous in retail where they are used to store product and price information and to track inventory, allowing for a speedy transaction. More recently, various types of matrix codes, the most common being the QR code, have been developed. Like barcodes, matrix codes store data as an optical representation. However, matrix codes store data in two dimensions, resulting in what generally appears as a grid of black and white squares, though implementations using other shapes and colors have been developed.

While optical representations of data such as the OR code are easy to display and read, they suffer from a limited data capacity. For example, a QR code implementing Version 40 of the QR standard and using the lowest possible error correction, since higher error correction further limits the code's data capacity, is capable of storing only 4,296 alphanumeric characters. Of course, QR codes and the like are not limited to storing alphanumeric characters, but capacity is further limited when more complex data types are stored. For example, a QR code with the same specifications as above could store only 1,817 Japanese characters.

Theoretically, one could design a matrix code with an arbitrarily high capacity by increasing its physical size and resolution. In practice, however, the size of a matrix code is limited by its display medium, which may often be no more than the corner of a small piece of paper. Furthermore, the resolution of a matrix code is limited by, among other things, the need to be easily readable by a variety of devices, such as smartphone cameras. For example, if the resolution of a matrix code is too high, its data-containing elements (e.g., squares, in the case of a QR code) may be too small to be correctly captured by a smartphone camera or other reading device.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

A method includes: capturing a current frame; decoding a syncdata and a portion of the data payload of the current frame; storing the portion of the data payload of the current frame in memory; determining whether all of the frames have been captured; combining each stored portion of the data payload into the data payload, if all of the frames have been captured; and, if all of the plurality of frames have not been captured, repeating the above steps.

Another method includes: sending an activation signal to a display device; capturing a current frame; decoding a syncdata and a portion of the data payload of the current frame; storing the portion of the data payload of the current frame in memory; determining whether a final frame has been captured; combining each stored portion of the data payload into the data payload, if the final frame has been captured; and, if the final frame has not been captured, repeating the above steps.

Another method includes: displaying a current frame; determining a next frame number; updating a current frame number to equal the next frame number; determining a frame display rate; holding the current frame on the display for a time, based on the display rate; and repeating the above steps.

Another method includes: receiving an activation signal; displaying a current frame; determining whether the current frame is a final frame; determining a next frame number; updating the current frame number to equal the next frame number, if the current frame is not the final frame; determining a display rate; holding the current frame on the display for a time, based on the display rate; and repeating the above steps if the current frame is not the final frame.

Another method includes: receiving a data payload; determining a quantity of frames; generating a plurality of frames of the quantity, wherein each of the frames includes syncdata and a portion of the data payload; and displaying each of the plurality of frames sequentially.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
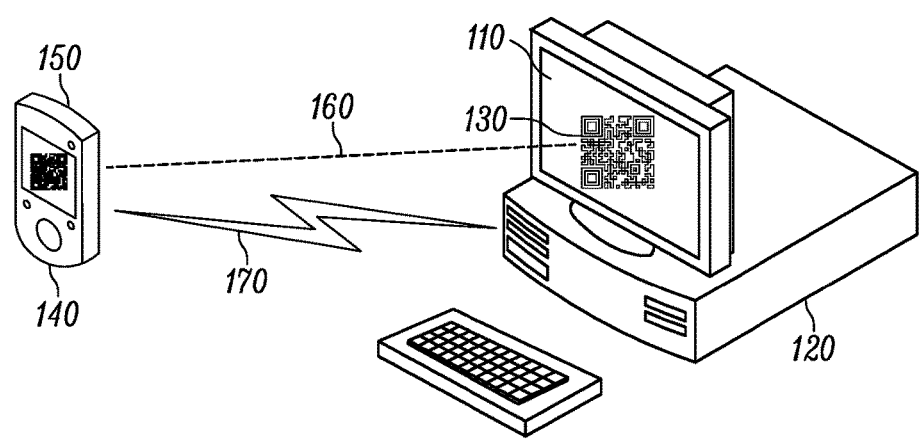
FIG. 1 is a physical depiction of an example use of a dynamic machine-readable optical representation of data.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As disclosed in more detail below, example methods are provided for reading, displaying, and generating a dynamic machine-readable optical representation of data ("dynamic code"). A dynamic code uses a plurality of frames to potentially store more data than would be possible in a normal (static) optical representation of data. Each frame includes a portion of a data payload and syncdata. For example, syncdata may include a frame display rate, a current frame number, a total number of frames, start and stop frame numbers, etc.

In some embodiments, a dynamic code is displayed on a display device in a continuous loop. For example, a display device may be an LCD monitor. Where the dynamic code is displayed in a continuous loop, a reading device (e.g., a smartphone with a camera) captures the currently displayed frame, decodes the syncdata, and stores the captured frame's payload portion in memory. The reading device repeats the process until all frames of the dynamic code have been captured. Once all of the frames have been captured, the reading device combines each stored payload portion to construct the data payload.

FIG. 1 is a physical depiction of an example use of a dynamic code. A display device 110 is connected to a processing device 120. In the illustrated example, the display device 110 is a computer monitor and the processing device 120 is a personal computer. In embodiments, the display device 110 may be any type of display, such as a television, electronic billboard, display, etc. that is powered by batteries, solar panels, line power, etc., and the processing device 120 may be a standalone processor or controller, etc. The processing device 120 instructs the display device 110 to display frames of a dynamic code 130. In the illustrated example, the dynamic code 130 is a dynamic QR code. A reading device 140 with an optical sensor 150 maintains an unobstructed line of sight 160 to the display device 110 to capture the displayed frame of the dynamic code 130. In the illustrated example, the reading device 140 is a smartphone and the optical sensor 150 is the smartphone's camera.

In the illustrated example, the reading device 140 sends an activation signal 170 to the processing device 120, instructing the processing device 120 to begin display of the dynamic code 130. For example, the activation signal 170 may be sent via Bluetooth, Bluetooth Low Energy (BLE), near-field communication, and/or WiFi. In embodiments, the reading device 140 may connect to the processing device 120 using a MAC address of the processing device 120, through the use of passwords, and via a cloud service (not shown), e.g., using a URL and/or a SSL link.

In some embodiments, the reading device 140 sends the activation signal 170 after scanning a static code on the display device 110. The static code on the display device 110 may indicate that a dynamic code is present and can be activated by the reading device 140 (i.e., by sending an activation signal 170). The static code on the display device 110 may also be utilized by reading devices which cannot interpret dynamic codes. For example, an abstract or summary of the data payload of the dynamic code may be encoded in the static code.

In embodiments, the activation signal 170 may include a desired frame display rate. In embodiments, the reading device 140 may send additional signals to the processing device 120 to change (e.g., increase or decrease) the frame display rate. The reading device 140 maintains the line of sight 160 with the display device 110, as the display device 110 displays successive frames of the dynamic code 130, until the reading device 140 has captured each frame of the dynamic code 130. In some embodiments, the dynamic code 130 is displayed as a picture-in-picture. Displaying the dynamic code 130 as a picture-in-picture enables the display device 110 to simultaneously display the dynamic code 130 and other content.

Figure 2:
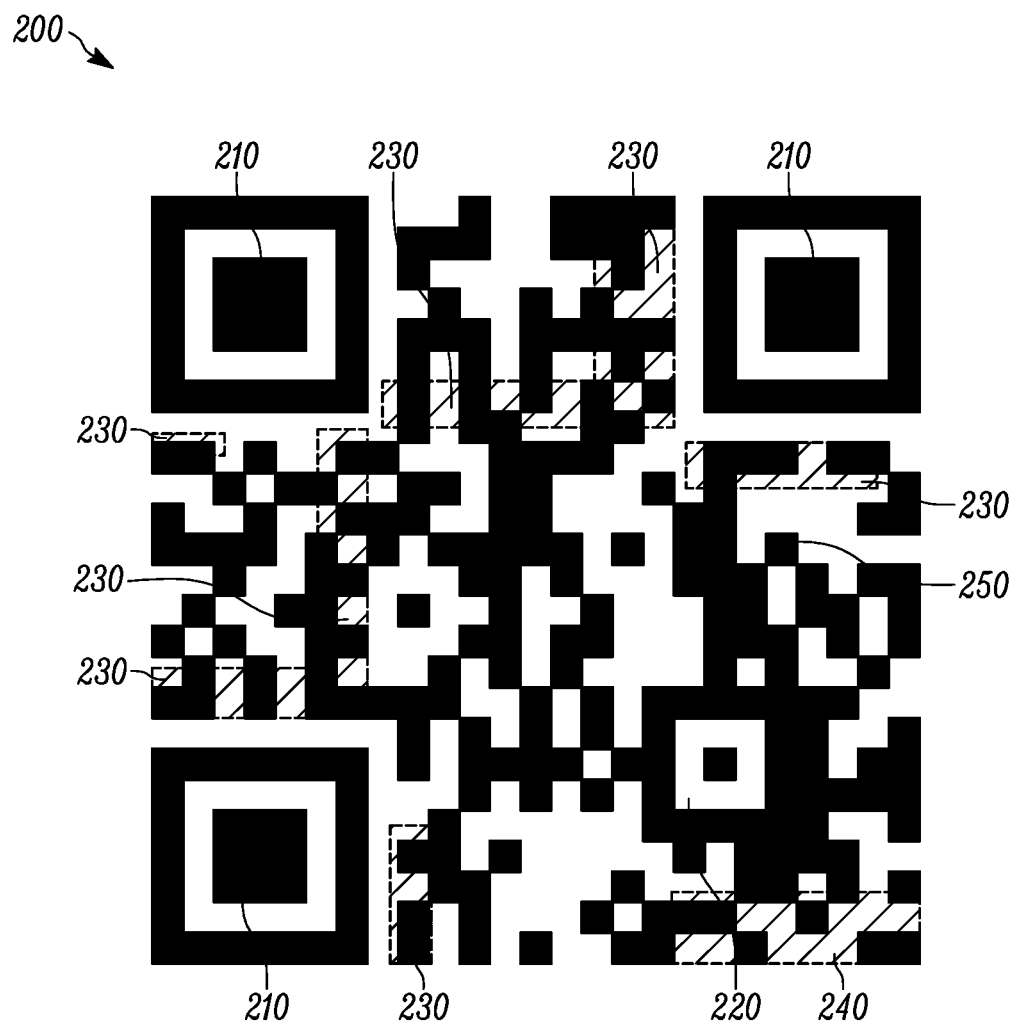
FIG. 2 is a diagram of an example frame of a dynamic machine-readable optical representation of data.

FIG. 2 is an example frame 200 of a dynamic code 130. In the illustrated example, the dynamic code 130 is a dynamic QR code. Accordingly, the frame 200 contains position markers 210, an alignment marker 220, and QR metadata 230 (e.g., version information, format information, etc.). In the illustrated example, syncdata 240 is located in the lower right corner of the frame 200. The remaining space in the frame 200 is used to store the data payload portion 250. While the illustrated example is a dynamic QR code, any number of encoding schemes may be used to implement a dynamic code. Therefore, in some examples the configuration of the syncdata, data, and other markers may be different from what is shown in the figure. For example, the syncdata, data, and other markers may be located anywhere in a frame.

Figure 3:
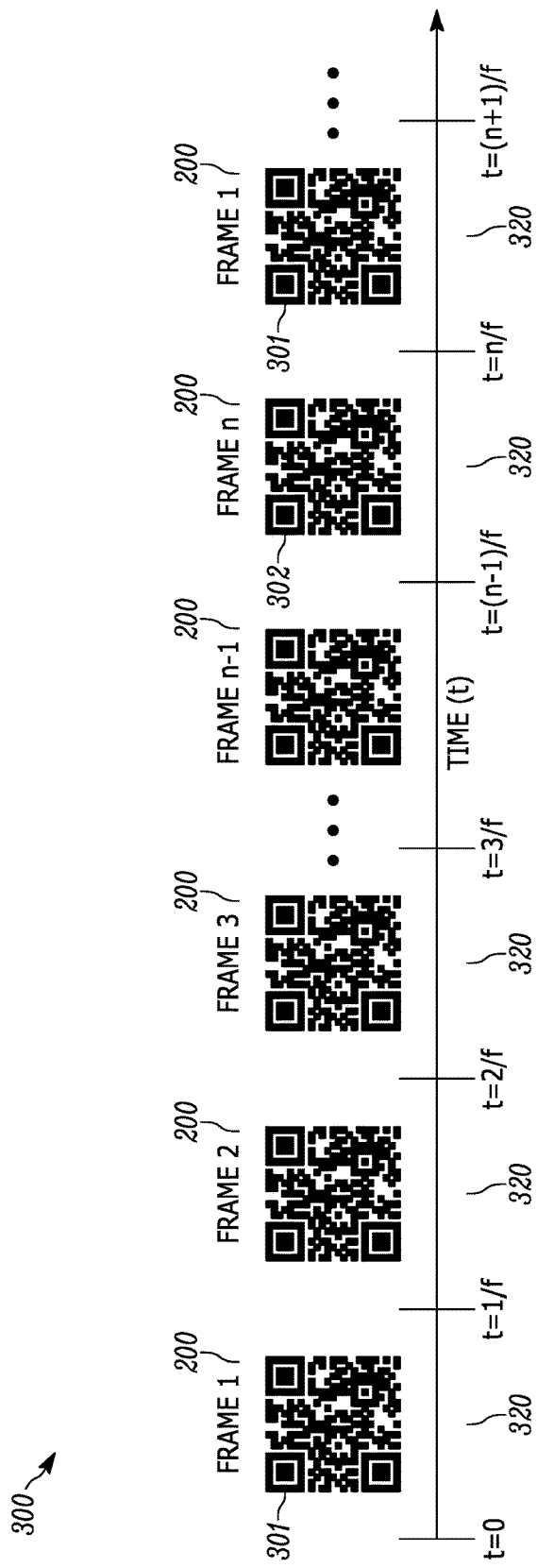
FIG. 3 is a timeline illustrating the timing of an example looping dynamic machine-readable optical representation of data.

FIG. 3 is an example timeline 300 illustrating the timing of a looping dynamic code 130. The dynamic code 130 contains n frames 200 and is displayed at a frame display rate f. n is a positive integer, for example, eleven, and f is a number of frames per unit time, for example, 24 frames per second.

Starting at time t=0, the display device 110 displays each frame 200 of dynamic code 130 one at a time. In the illustrated example, frames 200 are displayed in order starting with a first frame 301. Each frame 200 is held for an interval 320. The interval 320 is equal to one divided by the frame display rate, f. For example, where f equals 24 frames per second, the interval 320 is one twenty-fourth of a second. Accordingly, the final (i.e., nth) frame 302 is displayed at t=(n−1)/f. Since the illustrated example is looping, the sequence restarts with the first frame 301 at t=n/f.

Figure 4:
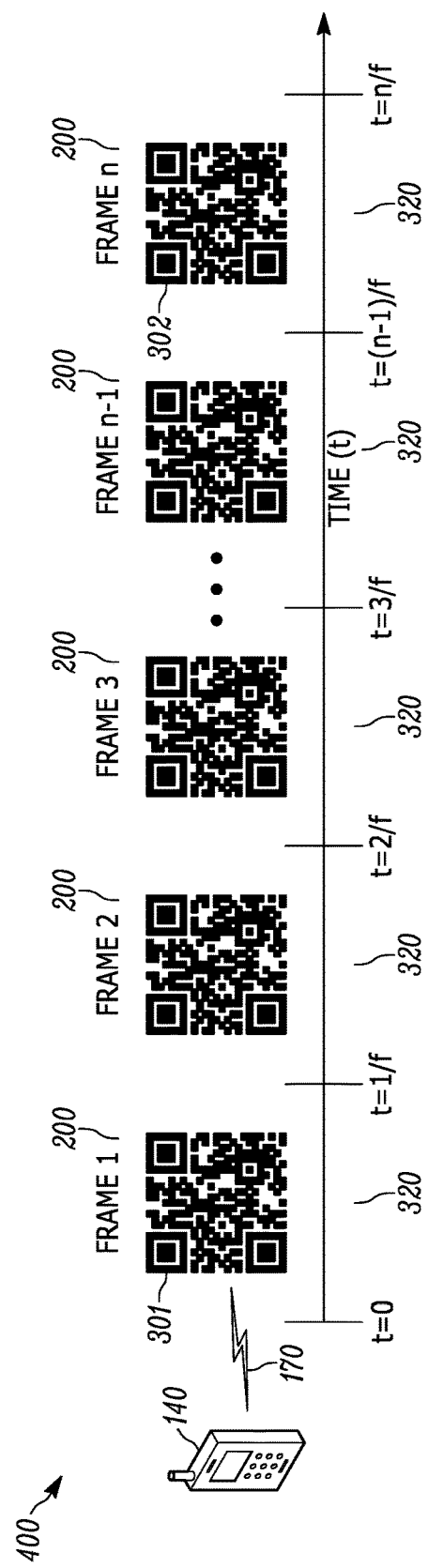
FIG. 4 is a timeline illustrating the timing of an example non-looping dynamic machine-readable optical representation of data.

FIG. 4 is an example timeline 400 illustrating the timing of a non-looping dynamic code 130 activated by an activation signal 170. The dynamic code 130 contains n frames 200 and is displayed at a frame display rate f. n is positive integer, for example, eleven, and f is a number of frames per unit time, for example, 24 frames per second.

In the illustrated example, at t=0 a reading device 140 sends an activation signal 170 to a display device 110, which displays the dynamic code 130, one frame 200 at a time. In the illustrated example, frames 200 are displayed in order starting with a first frame 301. Each frame 200 is held for an interval 320. The interval 320 is equal to one divided by the frame display rate, f. For example, where f equals 24 frames per second, the interval 320 is one twenty-fourth of a second. Accordingly, the final (i.e., nth) frame 302 is displayed at t=(n−1)/f. Since the illustrated example is not looping, the sequence ends after the nth frame 302, at t=n/f.

Figure 5:
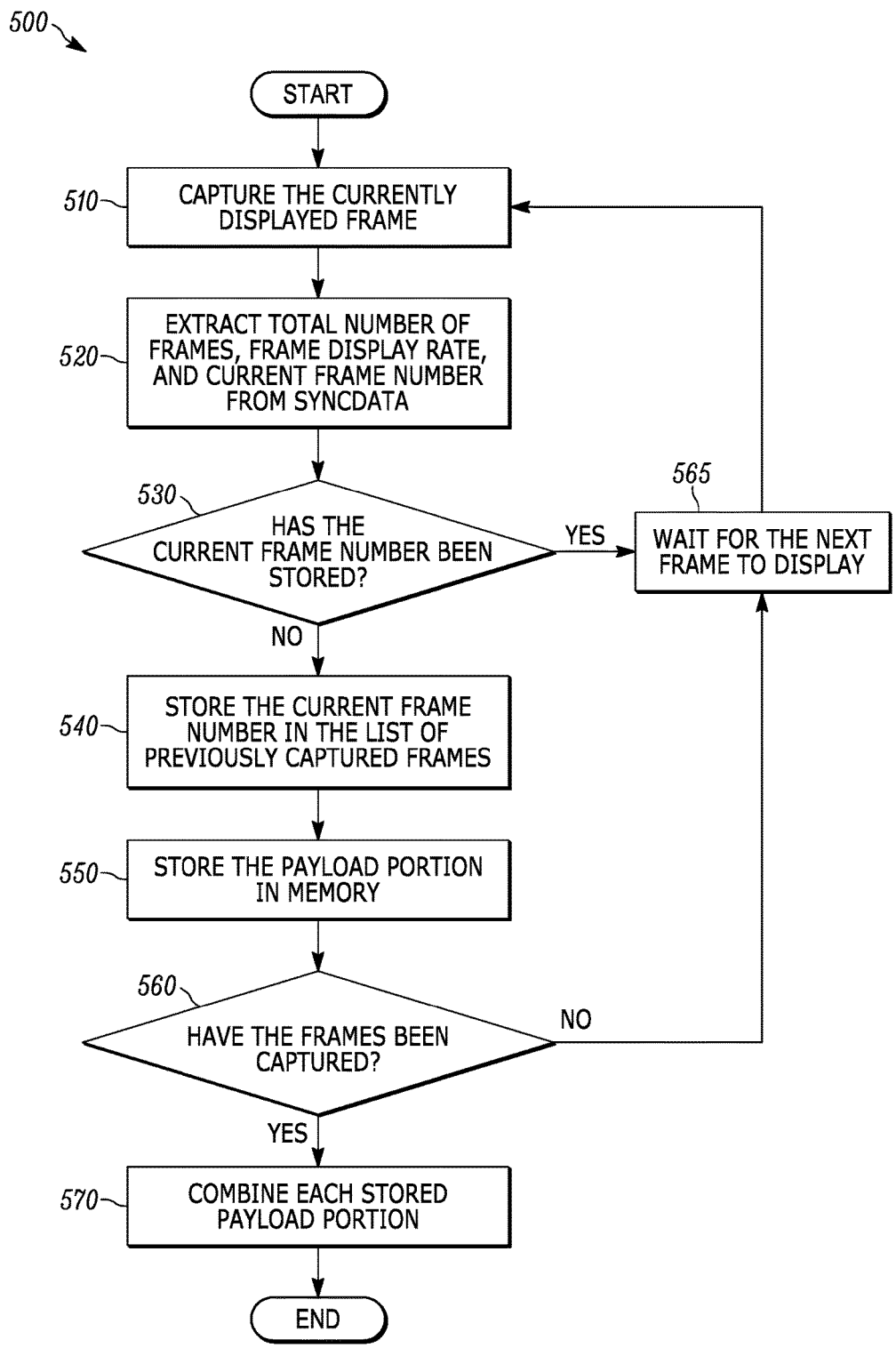
FIG. 5 is a flowchart of an example method for reading a looping dynamic machine-readable optical representation of data.

FIG. 5 is a flowchart of an example method 500 for reading a dynamic code 130. Initially, at block 510, the reading device 140, using an optical sensor 150, captures a frame 200 displayed by a display device 110. In some embodiments, the reading device 140 is a smartphone, the optical sensor 150 is the smartphone's camera, and the display device 110 is an LCD display. At block 520, the reading device 140 decodes the syncdata 240 from the frame 200. In the illustrated example, decoding the syncdata 240 includes extracting the total number of frames, a frame display rate, and the current frame number from the syncdata 240.

At block 530, the reading device 140 determines whether to store the payload portion 250 of the current frame 200. If the reading device 140 has not stored the current frame number in a list of previously captured frames, the method 500 proceeds to block 540. If the reading device 140 has stored the current frame number in the list of previously captured frames, the method 500 proceeds to block 565. At block 540, the reading device 140 stores the current frame number to the list of previously captured frames. At block 550, the reading device 140 stores the payload portion 250 of the current frame 200 to memory.

At block 560, the reading device 140 determines whether to combine the payload portions 250 or to continue capturing frames 200. If the reading device 140 has captured all frames 200 of the dynamic code 130, the method 500 proceeds to block 570. If the reading device 140 has not captured all frames 200 of the dynamic code 130, the method 500 proceeds to block 565. In some embodiments, the reading device 140 compares the number of frames 200 listed in the list of previously captured frames to the total number of frames, obtained from the syncdata 240. If the number of frames 200 listed in the list of previously captured frames is equal to the total number of frames, then all frames have been captured.

At block 565, the reading device 140 waits for the next frame to display before returning to block 510. In the illustrated example, the time waited is the reciprocal of the display frame rate (e.g., for a display frame rate of 24 frames per second, the time waited is one twenty-fourth of a second).

At block 570, the reading device 140 combines each stored payload portion 250 to construct the payload.

Figure 6:
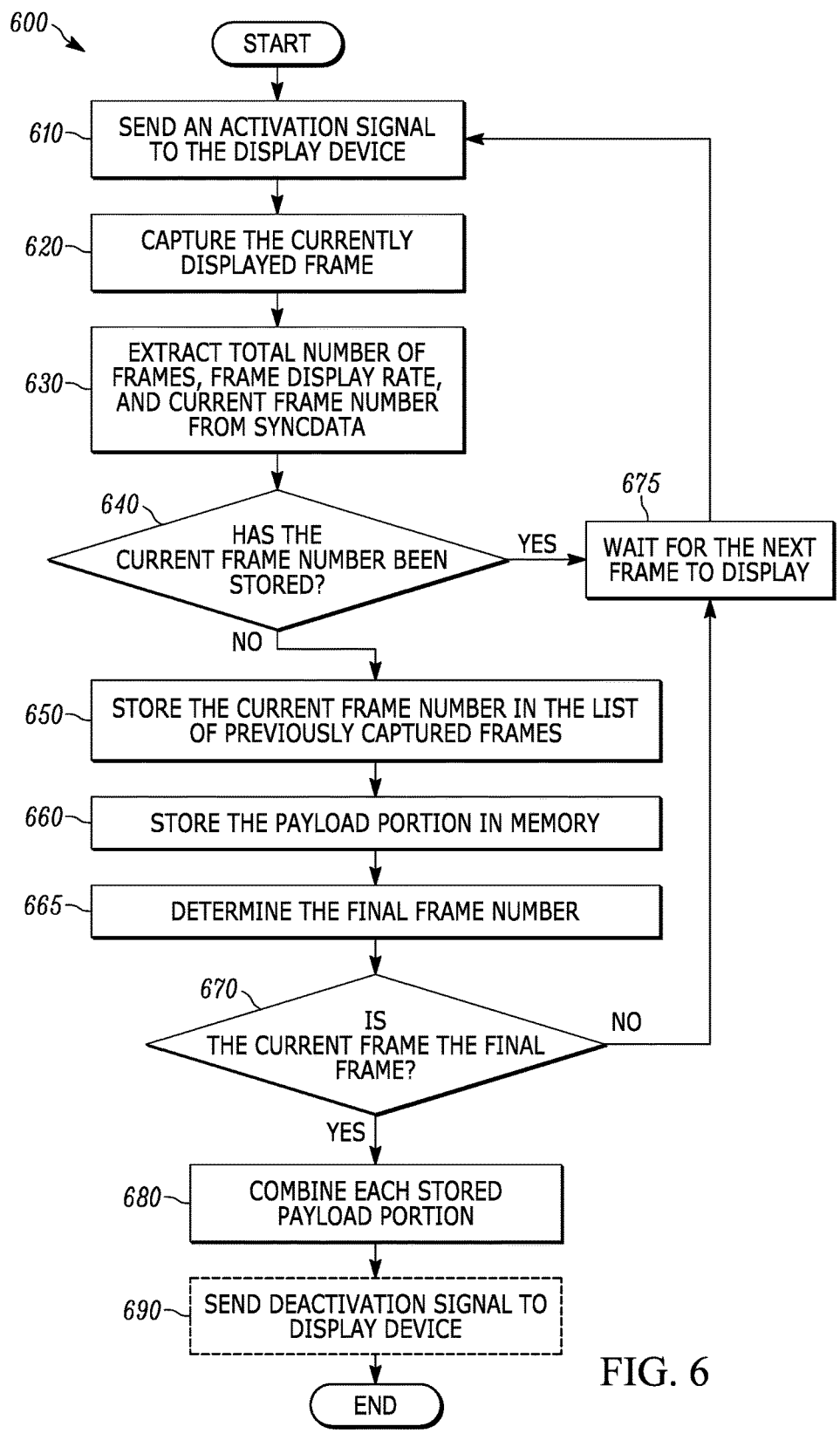
FIG. 6 is a flowchart of an example method for reading a non-looping dynamic machine-readable optical representation of data.

FIG. 6 is a flowchart of an example method 600 for reading a dynamic code 130, wherein the reading device 140 triggers the display of the dynamic code 130 via an activation signal 170. Initially, at block 610, the reading device 140 sends an activation signal 170 to the display device 110. At block 620, the reading device 140, using an optical sensor 150, captures a frame 200 displayed by the display device 110. In some embodiments, the reading device 140 is a smartphone, the optical sensor 150 is the smartphone's camera, and the display device 110 is an LCD display.

At block 630, the reading device 140 decodes the syncdata 240 from the frame 200. In the illustrated example, decoding the syncdata 240 includes extracting the total number of frames, a frame display rate, and the current frame number from the syncdata 240.

At block 640, the reading device 140 determines whether to store the payload portion 250 of the current frame 200. If the reading device 140 has not stored the current frame number in a list of previously captured frames, the method 600 proceeds to block 650. If the reading device 140 has stored the current frame number in the list of previously captured frames, the method 600 proceeds to block 675. At block 650, the reading device 140 stores the current frame number to the list of previously captured frames. At block 660, the reading device 140 stores the payload portion 250 of the current frame 200 to memory.

At block 665, the reading device 140 determines the final frame number. For example, the reading device 140 may calculate the final frame number based on the total number of frames and/or the final frame number may be explicitly contained in the syncdata 240.

At block 670, the reading device 140 determines whether the current frame is the final frame. If the current frame number is equal to the final frame number, then the current frame is the final frame and the method 600 proceeds to block 680. If the current frame number is not equal to the final frame number, then the current frame is not the final frame and the method 600 proceeds to block 675.

At block 675, the reading device 140 waits for the next frame to display before returning to block 610. In the illustrated example, the time waited is the reciprocal of the display frame rate (e.g., for a display frame rate of 24 frames per second, the time waited is one twenty-fourth of a second).

At block 680, the reading device 140 combines each stored payload portion 250 to construct the payload. At block 690, optionally, the reading device 140 stops the display of the dynamic code 130 on the display device 110 by sending a deactivation signal to the display device 110. The deactivation signal may be sent, for example, after the reading device 140 has constructed the payload, such as at block 680.

Figure 7:
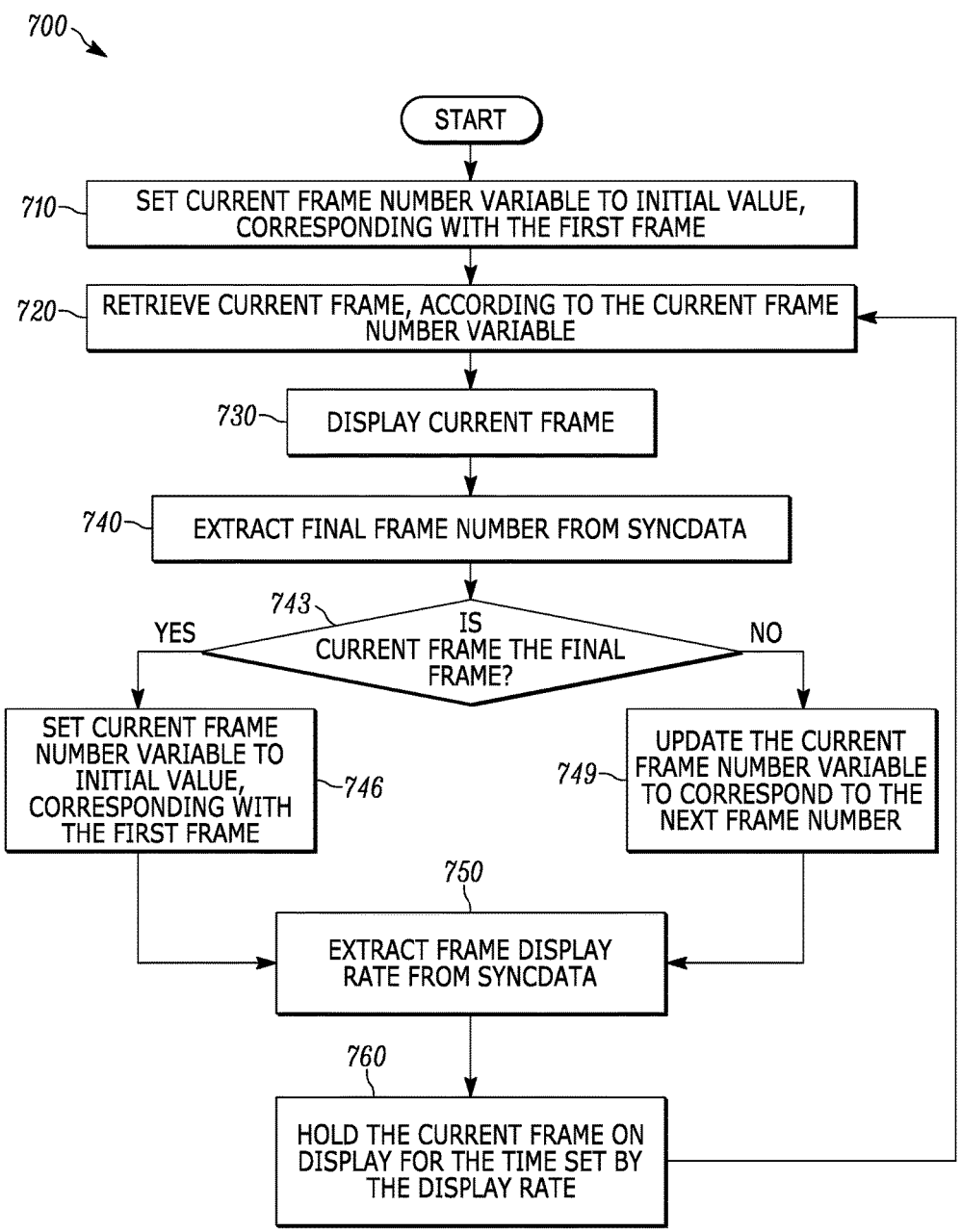
FIG. 7 is a flowchart of an example method for displaying a looping dynamic machine-readable optical representation of data.

FIG. 7 is a flowchart of an example method 700 for displaying a dynamic code 130. Initially, at block 710 a processing device 120 sets a current frame number variable to an initial value. In the illustrated example, the initial value corresponds with the first frame (i.e., the initial value is one, where frames are counted sequentially starting with one).

At block 720, the processing device 120 retrieves a current frame 200 from memory. In the illustrated example, the current frame 200 is the frame 200 with a frame number that equals the current frame number variable.

At block 730, the processing device 120 displays the current frame 200 via a display device 110.

At block 740, the processing device extracts a final frame number from the syncdata 240 of the current frame 200. At block 743, the processing device 120 determines whether the current frame 200 is the final frame 302. In the illustrated example, the processing device 120 compares the final frame number to the current frame number. If the current frame number equals the final frame number, then the current frame is the final frame. Otherwise, the current frame is not the final frame. In some embodiments, however, the current frame contains a final frame marker in the syncdata 240. In such embodiments, block 740 is unnecessary and block 743 determines whether the current frame is the final frame based on the final frame marker. If the current frame is the final frame, the method 700 proceeds to block 746. If the current frame is not the final frame, the method 700 proceeds to block 749.

At block 746, the processing device 120 sets the current frame number variable to the initial value and the method 700 proceeds to block 750. At block 749, the processing device 120 updates the current frame number variable to correspond to the next frame. In the illustrated example, the processing device 120 increments (e.g., increases by one) the current frame number variable. In other embodiments, the processing device 120 updates the current frame number variable to reflect a next frame number in the current frame's syncdata 240.

At block 750, the processing device 120 extracts a frame display rate from the current frame's syncdata 240. In one embodiment, the frame display rate may vary for a particular frame of a dynamic code 130, based on the amount of data in the particular frame. In this embodiment, block 750 may be executed for each frame of a dynamic code 130. In another embodiment, the frame display rate may be constant for all frames of a dynamic code 130. For example, the frame display rate may be set to a peak level where there is the maximum amount of data included in each frame. In such an embodiment, block 750 may be executed for the first frame of a dynamic code 130, i.e., to obtain the constant frame display rate, but not executed for the remainder of the frames of the dynamic code 130.

At block 760, the processing device 120 holds the current frame on the display device 110 for a time set by the frame display rate. For example, for a frame display rate of 24 frames per second, the processing device 120 may hold the current frame on the display device 110 for one twenty-fourth of a second. After the processing device 120 has held the current frame on the display device 110 for the time set by the frame display rate, the method 700 returns to block 720.

Figure 8:
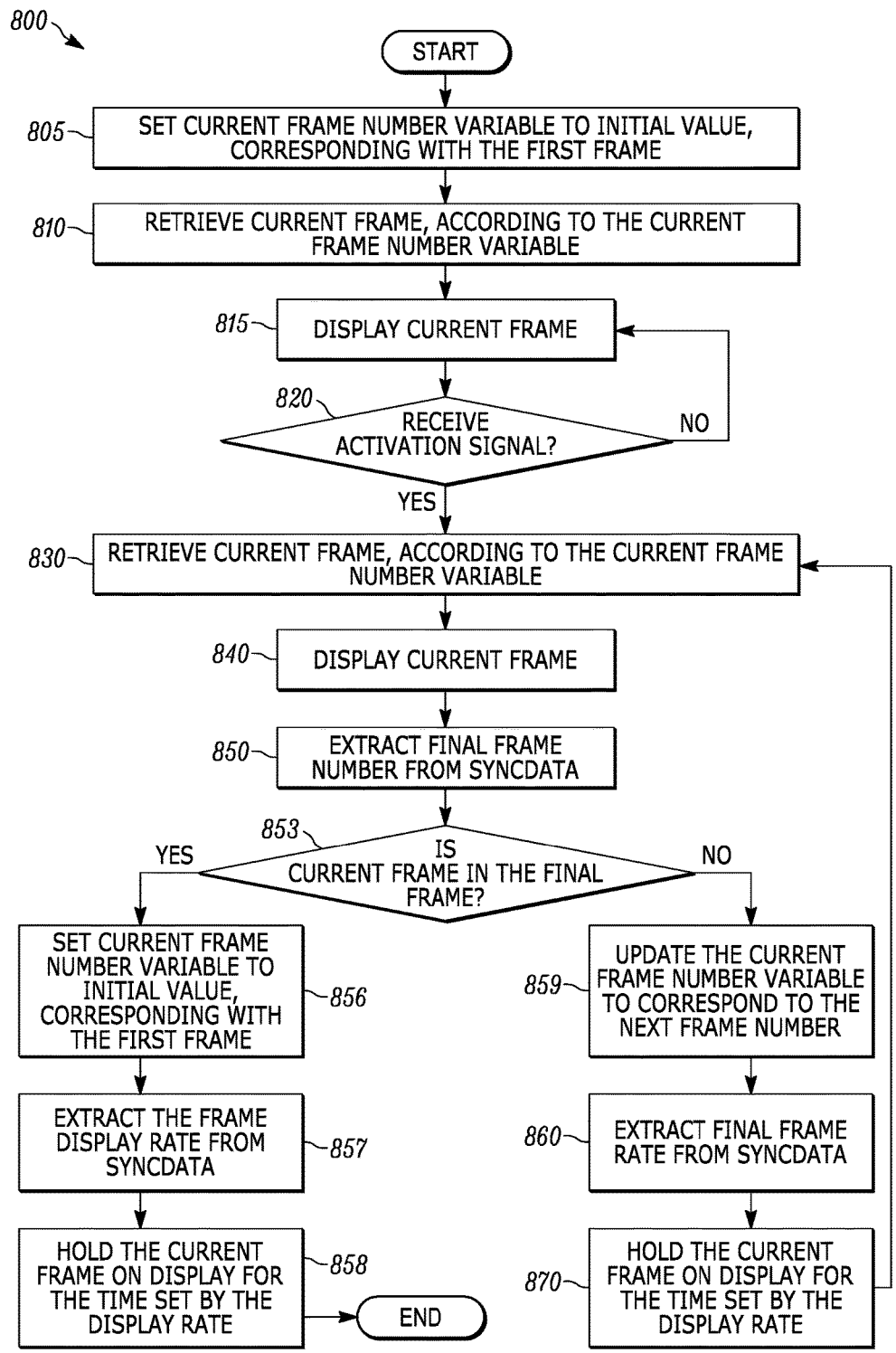
FIG. 8 is a flowchart of an example method for displaying a non-looping dynamic machine-readable optical representation of data.

FIG. 8 is a flowchart of an example method 800 for displaying a dynamic code 130, wherein the reading device 140 triggers the display of the dynamic code 130 via an activation signal 170. Initially, at block 805, the processing device 120 sets a current frame number variable to an initial value. In the illustrated example, the initial value corresponds with the first frame 301 (i.e., the initial value is one, where frames are counted sequentially starting with one).

At block 810, the processing device 120 retrieves a current frame 200 from memory. At block 815, the processing device 120 displays the current frame 200 via the display device 110. In the illustrated example, the current frame 200, at blocks 810 and 815, is the first frame 301.

At block 820, the processing device 120 determines whether an activation signal 170 has been received. If an activation signal 170 has not been received at block 820, then the method 800 returns to block 815 and continues to display the current frame 200, i.e., the first frame 301. The first frame 301 is therefore continually displayed until an activation signal 170 is received at block 820. However, if an activation signal 170 has been received at block 820, then the method 800 proceeds to block 830.

At block 830, the processing device 120 retrieves a current frame 200 from memory. In the illustrated example, the current frame 200 is the frame 200 with a frame number that equals the current frame number variable.

At block 840, the processing device 120 displays the current frame 200 via a display device 110.

At block 850, the processing device extracts a final frame number from the syncdata 240 of the current frame 200. At block 853, the processing device 120 determines whether the current frame 200 is the final frame 302. In the illustrated example, the processing device 120 compares the final frame number to the current frame number. If the current frame number equals the final frame number, then the current frame is the final frame. Otherwise, the current frame is not the final frame. In some embodiments, however, the current frame contains a final frame marker in the syncdata 240. In such embodiments, block 850 is unnecessary and block 853 determines whether the current frame is the final frame based on the final frame marker. If the current frame is the final frame, the method 800 proceeds to block 856. If the current frame is not the final frame, the method 800 proceeds to block 859.

At block 856, the processing device 120 sets the current frame number variable to the initial value. At block 857, the processing device 120 extracts a frame display rate from the current frame's syncdata 240. At block 858, the processing device 120 holds the current frame on the display device 110 for a time set by the frame display rate. For example, for a frame display rate of 24 frames per second, the processing device 120 may hold the current frame on the display device 110 for one twenty-fourth of a second.

At block 859, the processing device 120 updates the current frame number variable to correspond to the next frame. In the illustrated example, the processing device 120 increments (e.g., increases by one) the current frame number variable. In other embodiments, the processing device 120 updates the current frame number variable to reflect a next frame number in the current frame's syncdata 240.

At block 860, the processing device 120 extracts the frame display rate from the current frame's syncdata 240. At block 870, the processing device 120 holds the current frame on the display device 110 for a time set by the frame display rate. For example, for a frame display rate of 24 frames per second, the processing device 120 may hold the current frame on the display device 110 for one twenty-fourth of a second. After the processing device 120 has held the current frame on the display device 110 for the time set by the frame display rate, the method 800 returns to block 830.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method of receiving a data payload encoded in a machine-readable time-variant optical representation comprising a plurality of frames, the method comprising:
   transmitting, by a first device, an activation signal configured to cause the plurality of frames to be displayed by a second device; and
   after transmitting the activation signal, the first device:
   (A) capturing a current frame of the plurality of frames with an optical sensing device, wherein each of the plurality of frames comprises syncdata and a portion of the data payload;
   (B) decoding the syncdata and the portion of the data payload of the current frame, using a processor operatively coupled with the optical sensing device;
   (C) storing the portion of the data payload of the current frame in a memory operatively coupled with the processor;
   (D) determining whether all of the plurality of frames have been captured, based on the decoded syncdata, using the processor;
   (E) if all of the plurality of frames have been captured, combining each stored portion of the data payload into the data payload, using the processor; and
   (F) if all of the plurality of frames have not been captured, repeating steps (A)-(F).

2. The method of claim 1, wherein decoding the syncdata and the portion of the data payload comprises decoding the syncdata in the current frame to determine a total number of frames of the plurality of frames, using the processor.

3. The method of claim 2, wherein determining whether all of the plurality of frames has been captured comprises:
comparing a quantity of stored current frame numbers to the total number of frames;
determining that all of the plurality of frames have been captured, if the quantity of the stored current frame numbers is equal to the total number of frames; and
determining that all of the plurality of frames have not been captured, if the quantity of the stored current frame numbers is less than the total number of frames.

4. The method of claim 1, wherein decoding the syncdata and the portion of the data payload comprises:
decoding the syncdata in the current frame to determine a current frame number, using the processor;
storing the current frame number in the memory, if the current frame number has not previously been stored; and
returning to step (A), if the current frame number has been previously stored.

5. The method of claim 1, wherein:
decoding the syncdata and the portion of the data payload comprises decoding the syncdata in the current frame to determine a frame display rate, using the processor; and
capturing the current frame comprises capturing the current frame for the plurality of frames with the optical sensing device at the frame display rate.

6. The method of claim 1, wherein decoding the syncdata and the portion of the data payload comprises:
decoding the syncdata in the current frame to determine whether the current frame is a start frame of the plurality of frames, using the processor;
if the current frame is not the start frame, repeating step (A) until the current frame is the start frame; and
if the current frame is the start frame, continuing with steps (C)-(F).

7. The method of claim 1 further comprising:
capturing, by the first device, a static code; and
transmitting the activation signal responsive to capturing the static code.

8. The method of claim 7, wherein:
determining whether all of the plurality of frames have been captured comprises determining whether a final frame of the plurality of frames has been captured, based on the decoded syncdata, using the processor;
combining each stored portion of the data payload comprises if the final frame has been captured, combining each stored portion of the data payload into the data payload, using the processor; and
repeating steps (A)-(F) comprises if the final frame has not been captured, repeating steps (A)-(F).

9. The method of claim 8, wherein decoding the syncdata and the portion of the data payload comprises:
decoding the syncdata in the current frame to determine a total number of frames of the plurality of frames, using the processor; and
determining a final frame number, based on the total number of frames.

10. The method of claim 9, wherein determining whether the final frame has been captured comprises:
comparing a current frame number to the final frame number;
determining that the final frame has been captured, if the current frame number is equal to the final frame number; and
determining that the final frame has not been captured, if the current frame number is not equal to the final frame number.

11. The method of claim 9, wherein decoding the syncdata and the portion of the data payload further comprises:
decoding the syncdata in the current frame to determine a current frame number, using the processor;
storing the current frame number in the memory, if the current frame number has not previously been stored; and
returning to step (A), if the current frame number has been previously stored.

12. The method of claim 8, wherein:
decoding the syncdata and the portion of the data payload comprises decoding the syncdata in the current frame to determine a frame display rate, using the processor; and
capturing the current frame comprises capturing the current frame of the plurality of frames with the optical sensing device at the frame display rate.

* * * * *